US006904426B2

(12) United States Patent
Smith

(10) Patent No.: US 6,904,426 B2
(45) Date of Patent: Jun. 7, 2005

(54) METHOD, COMPUTER PROGRAM PRODUCT, AND SYSTEM FOR THE GENERATION OF TRANSACTION SCREEN DISPLAYS FROM A HIERARCHICAL DATABASE MANAGEMENT LOG UTILIZING A BATCH TERMINAL SIMULATOR

(75) Inventor: Alan R. Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/243,356

(22) Filed: Sep. 13, 2002

(65) Prior Publication Data

US 2004/0054641 A1 Mar. 18, 2004

(51) Int. Cl.[7] .............................................. G06F 17/30
(52) U.S. Cl. ........................... 707/1; 707/10; 707/104.1
(58) Field of Search .................... 707/1–10, 100–104.1, 707/202, 203; 705/37

(56) References Cited

U.S. PATENT DOCUMENTS 5,995,980 A  * 11/1999 Olson et al. ................ 707/201
6,092,085 A     7/2000  Keene .......................... 707/202
6,202,071 B1    3/2001  Keene .......................... 701/202
6,330,686 B1   12/2001  Denny et al. .................. 714/4
2002/0026508 A1 2/2002  Crain et al. ................. 709/224
2002/0138391 A1 * 9/2002 Kroeger ........................ 705/37

* cited by examiner

Primary Examiner—Charles Rones
Assistant Examiner—Neveen Abel-Jalil
(74) Attorney, Agent, or Firm—Gregory M. Plow

(57) ABSTRACT

A plurality of log records are extracted from the hierarchical database management log for subsequent processing by a batch terminal simulator (also referred to as BTS). A cross reference record is created for each of selected ones of the plurality of log records, the cross reference records forming a cross reference file. A BTS SYSIN file is also created comprising at least one "PA2 $" record. Then the batch terminal simulator is executed wherein a BTS screen display report is generated utilizing said BTS SYSIN file and wherein said BTS screen display report comprises a plurality of BTS screen display records, each of the plurality of BTS screen display records generated from a corresponding log record of the plurality of log records. Selected ones of the plurality of BTS screen display records corresponding to the selected ones of the plurality of log records are modified utilizing information from the cross reference file to form the transaction screen display report.

20 Claims, 8 Drawing Sheets

METHOD, COMPUTER PROGRAM PRODUCT, AND SYSTEM FOR THE GENERATION OF TRANSACTION SCREEN DISPLAYS FROM A HIERARCHICAL DATABASE MANAGEMENT LOG UTILIZING A BATCH TERMINAL SIMULATOR

FIELD OF INVENTION

The present invention relates generally to the display of log data, and more particularly to displaying the log data of a hierarchical database management system (HDBMS) in a form than simulates a transaction screen display.

BACKGROUND

Databases, such as IBM's IMS (Information Management System), are well known in the art. (IMS is a trademark of International Business Machines Corporation in the United States, other countries, or both.) IMS is a hierarchical database management system with wide spread usage in many large enterprises where high transaction volume, reliability, availability and scalability are of the utmost importance. IMS provides software and interfaces for running the businesses of many of the world's largest corporations.

A large DBMS, such as IMS, is highly scalable and in some enterprise environments may accommodate thousands, or even tens of thousands, of users connected to the system at any given point in time. Furthermore, the information and data managed by the DBMS may be highly sensitive data, critical to the operation of the enterprise as well as critical to the individual users of the DBMS system. Travel reservation systems, inventory control, and online banking systems are some typical examples. Therefore, it is typical for a large DBMS to include a logging capability to capture and record the various events that occur in the course of managing databases as various database requests and transactions are processed.

These log datasets (or files) typically contain a wealth of information. Although the primary purpose of these logs is to facilitate data and processing integrity of the database management system, users have often found many other uses for the data recorded on DBMS logs. For example, reviewing log records may be useful in identifying trends, managing performance, auditing users, system planning, etc.

System utilities, such as DFSERA10 in the case of IMS, are typically used to access and format log records. However, a significant drawback exists with today's formatting utilities in that the actual data within a particular field of a log record may be in one of numerous forms. Some of these forms are very difficult for humans to interpret, such as binary or hexadecimal data forms.

Accordingly, there is a great need to provide a log access and format utility for the hierarchical database management environment that presents log data of interest to a user within a context that will assist the user in interpreting and understanding the log data. Furthermore, it is highly desirable for this log utility to be flexible such that only log records of interest to the user are selectively formatted. The log utility should also be convenient to use whereby the DBMS is not adversely impacted in availability or performance during execution of the log utility.

SUMMARY OF THE INVENTION

To overcome these limitations in the prior art briefly described above, the present invention provides a method, program product and apparatus for generating a transaction screen display report from a hierarchical database management log. A transaction screen display report allows the viewing of complex log data in a form than is easy to understand by humans. This is accomplished by presenting the log data as "display screens" that resemble the look and feel of the actual display screens that were utilized by a user in entering hierarchical database transactions, and/or viewing transaction results, corresponding to the log data. A batch terminal simulator is used in a novel and non-obvious way to create the transaction screen display report.

A plurality of log records are extracted from the hierarchical database management log for subsequent processing by a batch terminal simulator (also referred to as BTS). A cross reference record is created for each of selected ones of the plurality of log records, the cross reference records forming a cross reference file. A BTS SYSIN file is also created comprising at least one "PA2 $" record. Then the batch terminal simulator is executed wherein a BTS screen display report is generated utilizing said BTS SYSIN file and wherein said BTS screen display report comprises a plurality of BTS screen display records, each of the plurality of BTS screen display records generated from a corresponding log record of the plurality of log records. Selected ones of the plurality of BTS screen display records corresponding to the selected ones of the plurality of log records are modified utilizing information from the cross reference file to form the transaction screen display report.

A utility program, or set of programs, operating in concert with a batch terminal simulator to generate a transaction screen display report from a hierarchical database management log is hereinafter referred to as a "BTS log playback utility".

In another embodiment of the present invention, the above-described method for generating a transaction screen display report from a hierarchical database management log may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel and non-obvious method for viewing a transaction screen display report generated from a hierarchical database management log is also disclosed. A hierarchical database management log is identified and a criteria for selecting log records from the hierarchical database management log is determined. A BTS log playback utility is invoked wherein the invocation includes parameters that communicate the identification of the hierarchical database management log and the criteria for selecting log records. The user then views the transaction screen display report, generated by the BTS log playback utility.

In this way, as discussed in greater detail infra, log data of interest is presented to a user within a context that will assist the user in interpreting and understanding the log data by simulating the transaction screen display corresponding to the transaction originally generating the log data. Furthermore, log records may be selectively formatted such that only log records of particular interest to a user are generated in the transaction screen display format. Further still, the generation of transaction screen displays is accomplished without requiring the use of the DBMS associated with the hierarchical database management log being processed. In this way, the overall availability and performance of the DBMS is not impacted during generation of the transaction screen display report.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a system, computer program product, and method for generating a transaction screen display report from a hierarchical database management log. In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described and claimed herein. The following description is presented to enable one of ordinary skill in the art to make and use the present invention and is provided in the context of a patent application and its requirements.

Figure 1:
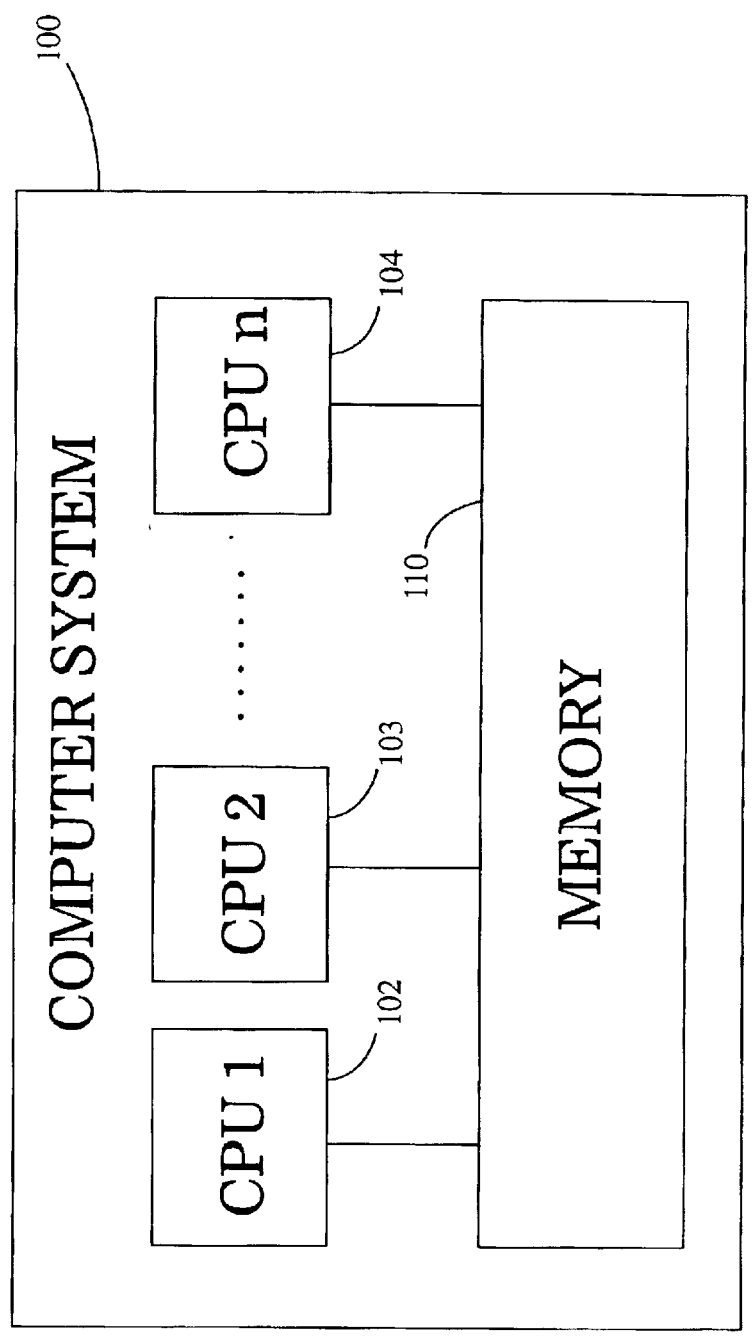
FIG. 1 is a block diagram of a typical computer system wherein the present invention may be practiced.

FIG. 1 is a block diagram of a computer system 100, such as the Z/OS mainframe computer system, in which teachings of the present invention may be embodied. The computer system 100 comprises one or more central processing units (CPUs) 102, 103, and 104. The CPUs 102–104 suitably operate together in concert with memory 110 in order to execute a variety of tasks. In accordance with techniques known in the art, numerous other components may be utilized with computer system 100, such as input/output devices comprising keyboards, displays, direct access storage devices (DASDs), printers, tapes, etc. (not shown).

Although the present invention is described in a particular hardware environment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

Figure 2:
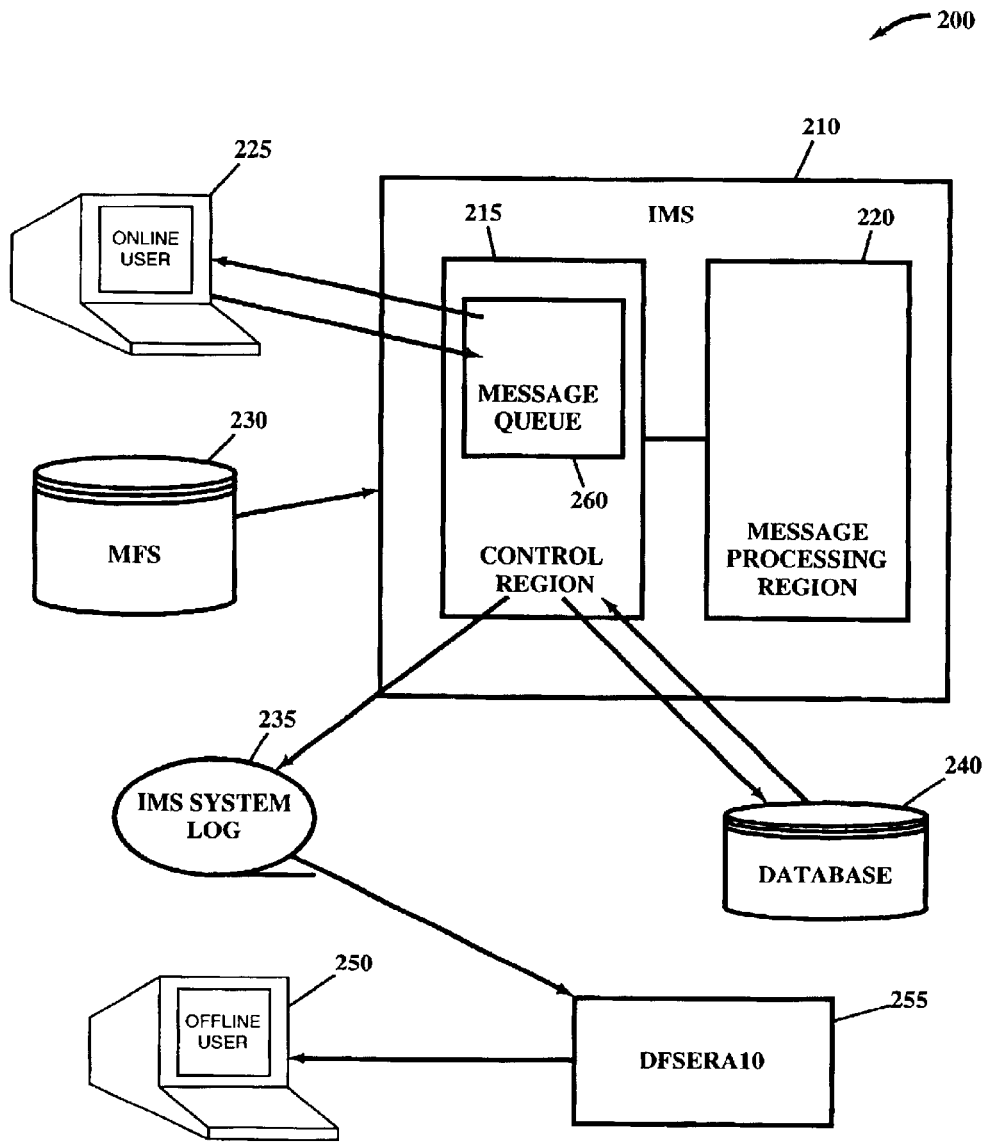
FIG. 2 is a block diagram of an exemplary prior art method of viewing DBMS log data.

Referring now to FIG. 2, a block diagram is shown illustrating an exemplary prior art environment illustrating a typical method for viewing hierarchical database management logs. User terminal 225 initiates transactions and receives results from IMS 210, comprising control region 215 and at least one message processing region 220. Those of ordinary skill in the art will recognize that this process results in messages being written to message queue 260 by control region 215 to record incoming transactions as well as outgoing results to be received by online user terminal 225.

Control region 215 writes various items of information to IMS system log 235 in the course of processing messages written to message queue 260. An input to message queue 260 from a source external to IMS, such as online user terminal 225, results in the queuing of an input message, which is logged in message queue 260 as a '01'X type record. An input to message queue 260 from a component internal to IMS, such as a Message Processing Program, results in the queuing of an output message, which is logged in message queue 260 as a '03'X type record. Control region 215 also interfaces with message processing region 220 to perform the actual application business logic associated with these transactions including the modification of and/or retrieval of data from database 240.

Typically, online IMS transactions utilize MFS (Message Format Services) library 230 of FIG. 2 to describe the format of input and output messages associated with transactions, as well as descriptive information for the input devices (devices from which transactions are generated) and output devices (devices receiving transaction results). The MFS library 230 comprises records known as message input descriptors (MID), message output descriptors (MOD), device input format (DIF) and device output format (DOF). Records in log 235 typically capture, among other data, queue messages appended with MOD identifiers to correlate the particular information from MFS 230 corresponding to these queue messages and their associated devices.

User terminal 250 is offline with respect to IMS 210 and is utilized to view all or a portion of the information contained in IMS system log 235. User terminal 250 interfaces with utility DFSERA10 255 to access and format data from log 235. There are many reasons for viewing the contents of a hierarchical database management log from a historical perspective. As discussed supra, these reasons include trend analysis, managing performance, auditing users, system planning, etc. However, prior art systems have limited capabilities for displaying this historical data in a form conducive to human understanding. Typically, the user of terminal 250 would need to access application program data structures, a tedious and error prone task, in deciphering this arcane data.

Figure 6:
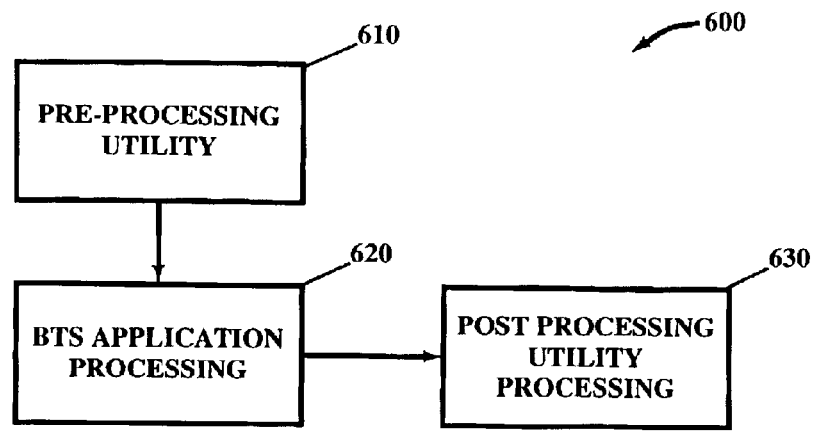
FIG. 6 is a high level flow diagram summarizing the generation of a transaction screen display report from an IMS system log in accordance with one embodiment of the present invention.

Referring now to FIG. 6, flow diagram 600 illustrates the high-level logic flow of one embodiment for creating a transaction screen display report. In step 610, a pre-processing utility is invoked to perform BTS preparatory processing. Continuing with step 620, BTS application processing is performed within a BTS execution environment. Then, in step 630, a post processing utility is invoked to generate the final transaction screen display report.

While the above flow diagram 600 represents a suitable program structure for teaching the present invention, it is to be understood that the purpose of this program structure is of an exemplary nature and that numerous other program structures may serve equally well in teaching the present invention. For example, pre-processing utility 610 processing could be combined with BTS application processing 620, or any other combination or division of processes. Accordingly, the present invention is not limited to the particular exemplary structures but is to be accorded the widest scope consistent with the principles and features described herein.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
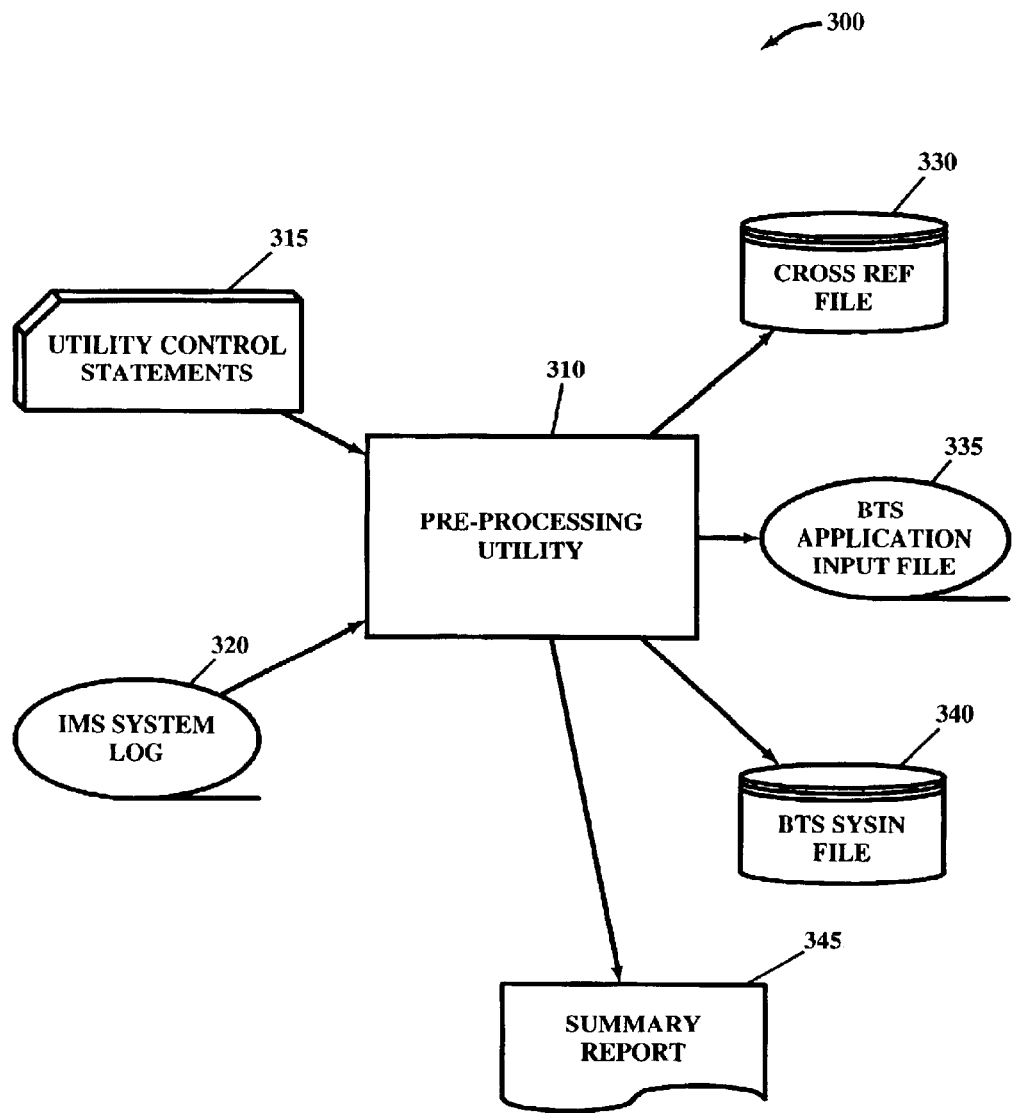
FIG. 3 is a block diagram of an exemplary pre-processor utility in accordance with one embodiment of the present invention.
Figure 7:
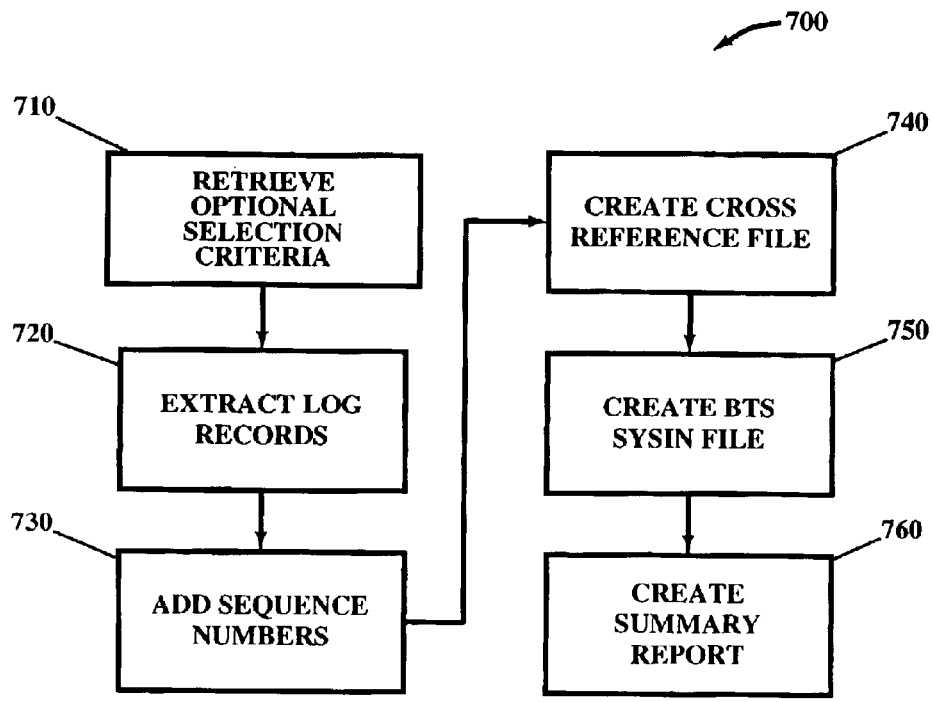
FIG. 7 is a flow diagram summarizing a pre-processing utility in accordance with one embodiment of the present invention.

Referring now to FIG. 7, in conjunction with FIG. 3, flow diagram 700 illustrates the logic flow of one embodiment for pre-processing utility 310. In step 710, an optional user specified selection criteria is retrieved. In a preferred embodiment, this optional user search criteria may be retrieved from utility control statements 315. Those of ordinary skill in the art will recognize that a large variety of methods may be utilized to communicate a search criteria to pre-processor utility 310, such as the utilization of a control file that is identified by a parameter upon invocation, or a static system file.

Continuing with step 720 records from IMS system log 320 are extracted in accordance with the optional user search criteria. IMS system log 320 is typically identified via utility control statements 315, although numerous other suitable means of identification are possible, as will be appreciated by those of ordinary skill in the art. In the absence of any search criteria, a default extraction method may be utilized. In a preferred embodiment, the default extraction method selects all transaction input and output messages from IMS system log 320. Those of ordinary skill in the art can appreciate that the use of a single log in this descriptive mater is exemplary and that in actual practice, several logs may be identified for processing by pre-processing utility 310. For example, IMS has an Online Log Data Set (OLDS) and a Secondary Log Data Set (SLDS). One or more of each of these types of log data sets may be identified within an IMS environment for processing by a BTS log playback utility.

Continuing now with step 730, a sequence number is appended to each extracted log record and this set of records, as modified, are preserved in BTS application input file 335. Next, in step 740, cross reference file 330 is created. Cross reference file 330 contains additional information from IMS system log 320 correlated with BTS application input file 335, which will be used later, as discussed infra, in post processing utility 630 from FIG. 6. A single input or output message captured in IMS system log 320 may correspond to a plurality of related BTS application input file records. Accordingly, each record within cross reference file 330 will correspond to only the first record of a related group of BTS application input file records.

In step 750, BTS SYSIN file 340 is created. This file contains zero or more "PA1 $" records and zero or more "PA2 $" records. These special control sequences direct the generation of BTS screen display records. There is one "PA2 $" record for each message on the BTS message queue beyond the first message. Interspersed with these "PA2 $" records may optionally be one or more "PA1 $" records. For each message on the BTS message queue representing a multi-screen message, there is one "PA1 $" record for each additional screen, beyond the first screen, of the multi-screen message. These special control sequences will be retrieved during BTS application processing 620, FIG. 6, as described in greater detail infra in conjunction with FIG. 8.

Finally, in step 760, summary report 345 is created. In a preferred embodiment, summary report 345 contains the search criteria utilized during pre-processing as well as the transaction identifiers, user identifiers and MODs detected on IMS system log 320.

Figure 4:
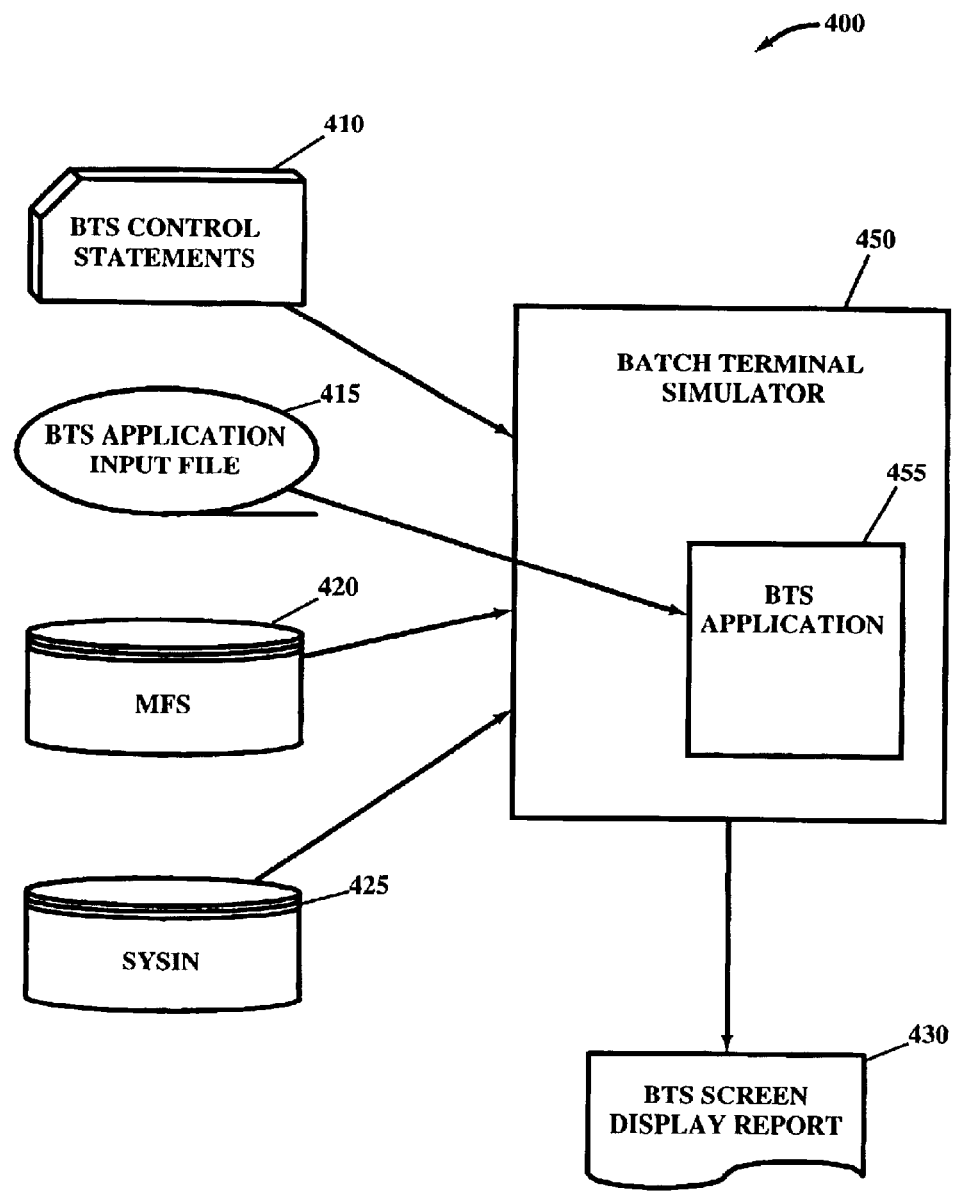
FIG. 4 is a block diagram of an exemplary BTS application in accordance with one embodiment of the present invention.
Figure 8:
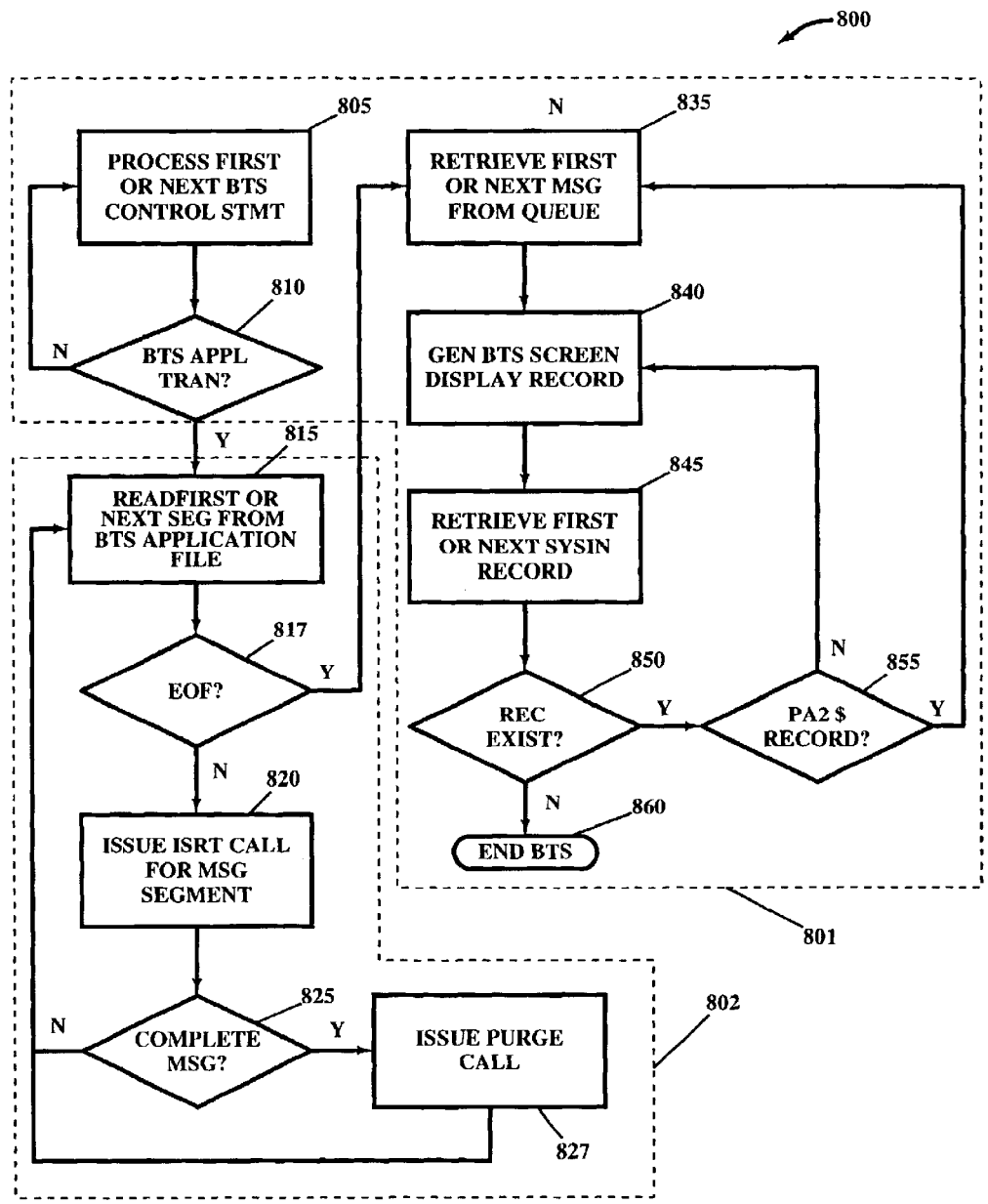
FIG. 8 is a flow diagram summarizing BTS application processing in accordance with one embodiment of the present invention.

Referring now to FIG. 8, in conjunction with FIG. 4, flow diagram 800 illustrates the logic flow of one embodiment for batch terminal simulator 450 and BTS application 455. The logic steps associated with batch terminal simulator 450 are designated by boundary 801, as shown in FIG. 8. The logic steps associated with BTS application 455 are designated by boundary 802, as shown in FIG. 8.

First, in step 805, a first or next BTS control statement 410 is processed. These statements are read and processed in accordance typical batch terminal simulator processing, familiar to those of ordinary skill in the art, until, in step 810 a test determines that the control statement just read is a BTS application transaction. If a BTS application transaction control statement is read, control passes to step 815 where BTS application 455 receives control from batch terminal simulator 450 and reads a record from BTS application input file 415.

In step 817, test is made to determine if end-of-file (EOF) has been reached. If so, control passes to step 835, otherwise processing continues with step 820 where an ISRT (insert) CALL is made for the message segment just read from BTS application input file 415. In step 825, a test is made to determine if a complete message has been processed. Those of ordinary skill in the art will recognize that a queue message comprises one or more message segments. A test is made in step 825 to determine if all message segments for a queue message have been inserted on the BTS message queue (i.e. a test is made to determine if the message is complete, in that all segments have been inserted). If so, control passes to step 827 where a PURGE call is issued to signal message completion to batch terminal simulator 450 prior to returning to step 815. If the message is not complete (i.e. more message segments remain) then control returns to step 815 to read the next message segment from BTS application input file 415, as discussed supra.

Returning now to step 835, which received control from step 817 discussed supra, control returns to batch terminal simulator 450 where the first or next message that was inserted on the BTS message queue is retrieved. In step 840, the message is transformed by batch terminal simulator 450 into a BTS transaction screen display record and is written to BTS screen display report 430.

Continuing with step 845 the first or next record is retrieved from SYSIN file 425 and then in step 850 a test is made to determine the record exists. If so, a test is made in step 855 to determine if the record is a "PA2 $" record or a "PA1 $" record. A "PA1 $" record indicates that another screen of a multi-page screen needs to be processed; and a "PA2 $" record indicates that the current queue message is complete and the next message from the queue must be processed. If a "PA2 $" record, control returns to step 835 to retrieve the next message from the BTS message queue, as described supra. Otherwise, the record is a "PA1 $" record and control returns to step 840 to generate the BTS screen display record for the next display of the current BTS message queue record. Returning now to step 850, if the next record from SYSIN file 425 does not exist then, in step 860, BTS application processing 620, FIG. 6, is complete.

Figure 5:
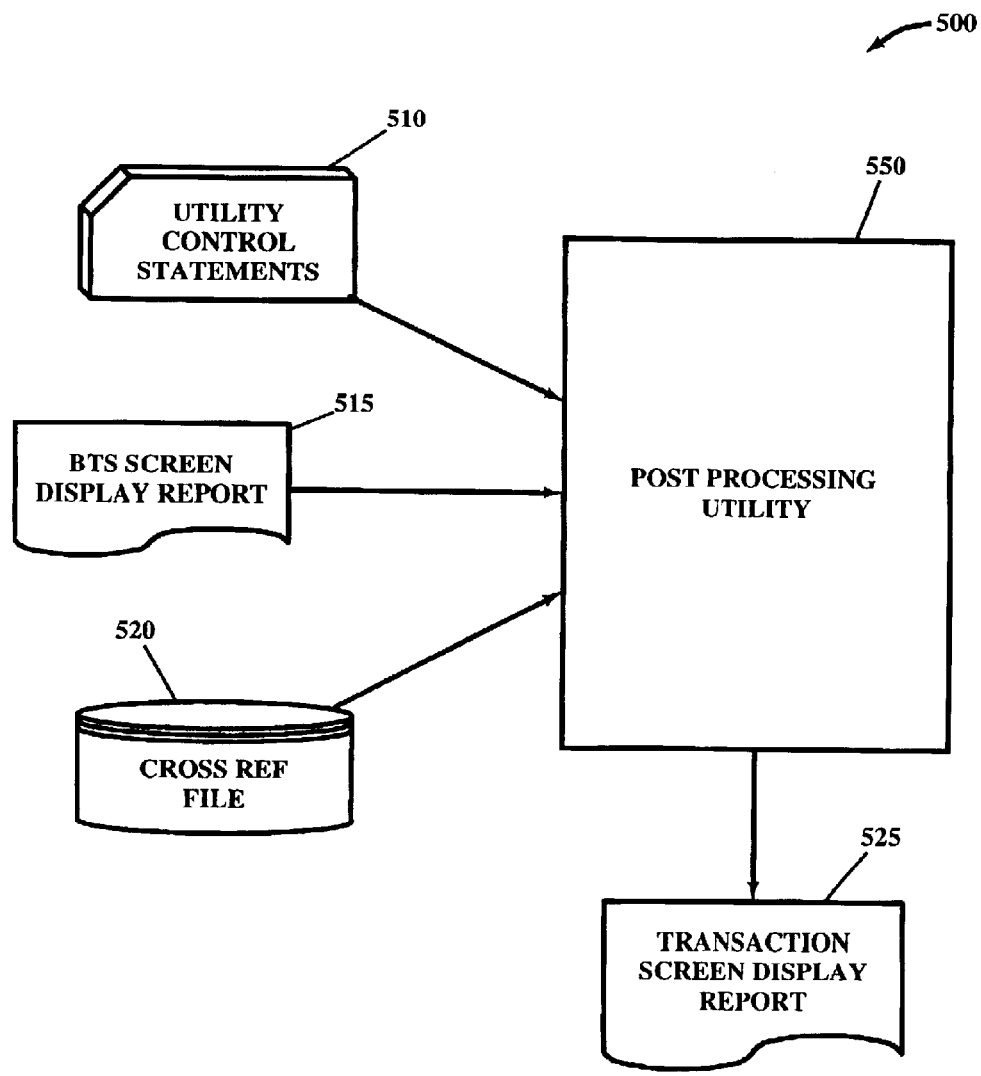
FIG. 5 is a block diagram of an exemplary post processing utility in accordance with one embodiment of the present invention.
Figure 9:
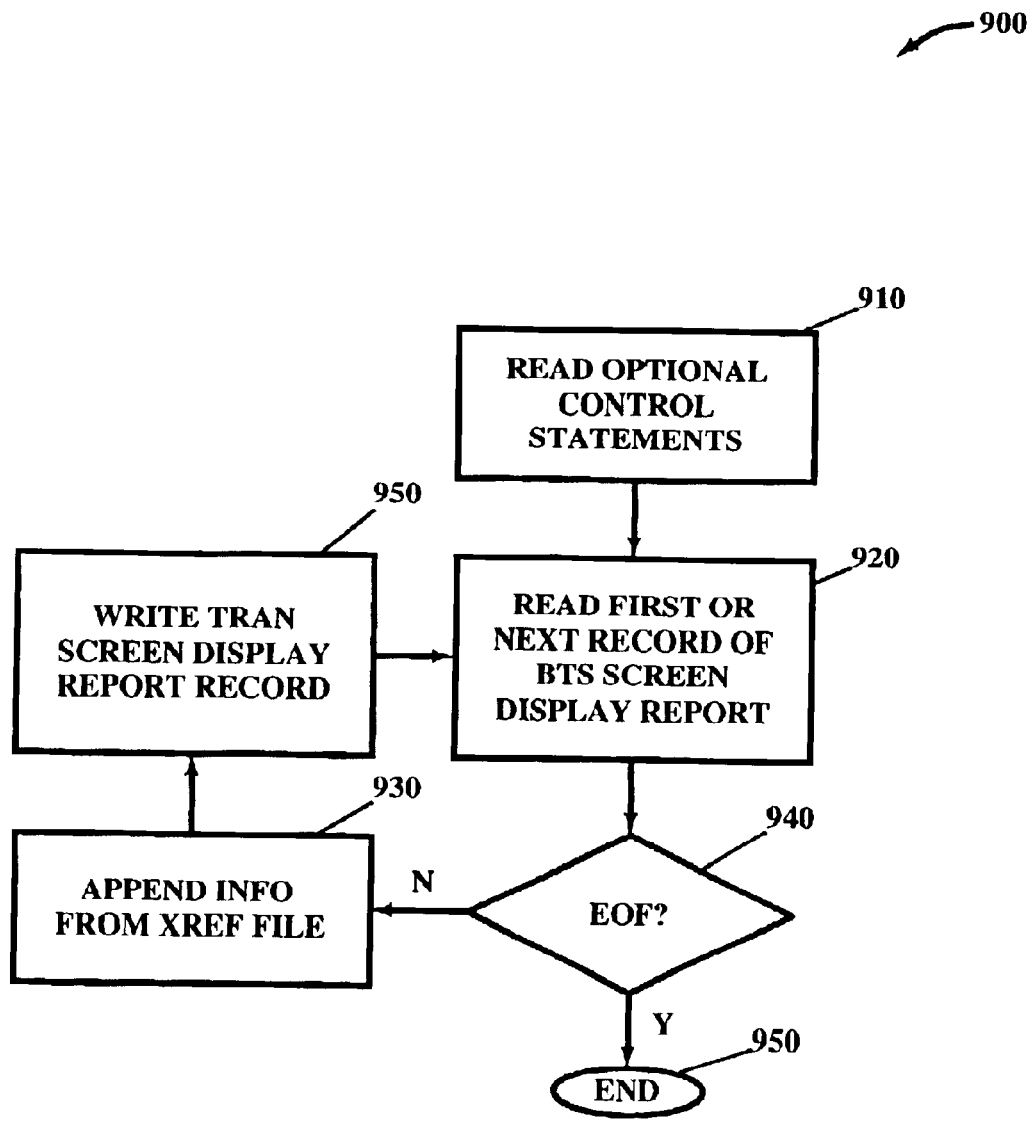
FIG. 9 is a flow diagram summarizing a post processing utility in accordance with one embodiment of the present invention.

Referring now to FIG. 9, in conjunction with FIG. 5, flow diagram 900 illustrates the logic flow of one embodiment for post processing utility 550. First, instep 910, utility control statements 510 are read. Control statements are utilized to direct the processing of post processing utility 550 by identifying needed information, such as the name of BTS screen display report 515 or, optionally, additional search criteria to further select records of interest for additional processing. Those of ordinary skill in the art will recognize that a variety of information may be passed to a utility program in this manner. Furthermore, those of ordinary skill in the art will also appreciate that a variety of other methods may be utilized, as briefly discussed supra, to pass requisite information to post processing utility 550.

Continuing with step 920, the first or next record from BTS screen display report 515 is read. In step 940, a test is made to determine if EOF has been reached. If EOF has not been reached, then control passes to step 930 where information, correlated by sequence number described supra, is appended from cross reference file 520. In the event that this record is part of a multiple sequence of records corresponding to a multiple screen transaction, then the additional cross reference information is only appended to the first record of the sequence and is not appended to the remaining records of the sequence.

Next, in step 950, the BTS screen display record, as potentially modified in step 930 supra, is written as a transaction screen display record to transaction screen display report 525. Control then returns to step 920, discussed supra.

Returning now to step 940, if EOF has been reached, then, in step 950, processing completes and the set of transaction screen display records written in step 950 form the completed transaction screen display report 525. Those of ordinary skill in the art will recognize that transaction screen display report 525 may take a variety of forms, such as a hardcopy printout, a series of display screens at a workstation, PC or the like, a file, network transmission, etc.

Taken in combination, flow diagrams 600, 700, 800 and 900 in conjunction with supporting diagrams and detailed descriptions provide for an improved method for viewing the log data from a hierarchical database management log. This is accomplished by utilizing a batch terminal simulator environment in a novel and non-obvious way to generate a transaction screen display report from the log data.

Although the preferred embodiment has been disclosed using IMS as an exemplary platform, those of ordinary skill in the art will appreciate that the teachings contained herein apply to any hierarchical DBMS. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modifications and adaptations to the embodiment(s) shown may occur to one of ordinary skill in the art without departing from the scope of the present invention as set forth in the following claims. Thus, the scope of this invention is to be construed according to the appended claims and not limited by the specific details disclosed in the exemplary embodiments.

What is claimed:

1. A method for viewing a transaction screen display report generated from a hierarchical database management log comprising the steps of:

identifying said hierarchical database management log;

determining a criteria for selecting log records from said hierarchical database management log;

invoking a BTS log playback utility wherein said invocation includes parameters that communicate said identification of said hierarchical database management log and said criteria for selecting log records; and viewing said transaction screen display report generated by said BTS log playback utility.

2. A computer implemented method for generating a transaction screen display report from a hierarchical database management log comprising:

extracting a plurality of log records from said hierarchical database management log for subsequent processing by a batch terminal simulator;

creating a cross reference record for each of selected ones of said plurality of log records, said cross reference records forming a cross reference file;

creating a BTS SYSIN file comprising at least one "PA2 $" record;

executing said batch terminal simulator wherein a BTS screen display report is generated utilizing said BTS SYSIN file and wherein said BTS screen display report comprises a plurality of BTS screen display records, each of said plurality of BTS screen display records generated from a corresponding log record of said plurality of log records; and modifying selected ones of said plurality of BTS screen display records corresponding to said selected ones of said plurality of log records utilizing information from said cross reference file to form said transaction screen display report.

3. The method of claim 2 wherein said hierarchical database management log is generated by an IMS HDBMS.

4. The method of claim 3 wherein said extracting, creating, executing and modifying is performed independent of said IMS HDBMS.

5. The method of claim 2 wherein said extracting step further comprises the application of a user specified selection criteria.

6. The method of claim 2 wherein said transaction screen display report comprises a file.

7. The method of claim 3 wherein said plurality of BTS screen display records correspond to IMS queue messages.

8. The method of claim 7 wherein said transaction screen display report is viewable in a form that approximates in its appearance display screens utilized in the formation of said corresponding IMS queue messages.

9. A computer system for generating a transaction screen display report from a hierarchical database management log, said computer system comprising:
   a computer;
   means for extracting a plurality of log records from said hierarchical database management log for subsequent processing by a batch terminal simulator;
   means for creating a cross reference record for each of selected ones of said plurality of log records, said cross reference records forming a cross reference file;
   means for creating a BTS SYSIN file comprising at least one "PA2 $" record;
   means for executing said batch terminal simulator wherein a BTS screen display report is generated utilizing said BTS SYSIN file and wherein said BTS screen display report comprises a plurality of BTS screen display records, each of said plurality of BTS screen display records generated from a corresponding log record of said plurality of log records; and
   means for modifying selected ones of said plurality of BTS screen display records corresponding to said selected ones of said plurality of log records utilizing information from said cross reference file to form said transaction screen display report.

10. The system of claim 9 wherein said hierarchical database management log is generated by an IMS HDBMS.

11. The system of claim 10 wherein said extracting, creating, executing and modifying means are performed independent of said IMS HDBMS.

12. The system of claim 10 wherein said plurality of BTS screen display records correspond to IMS queue messages.

13. The system of claim 12 wherein said transaction screen display report is viewable in a form that approximates in its appearance display screens utilized in the formation of said corresponding IMS queue messages.

14. An article of manufacture for use in a computer system tangibly embodying computer instructions executable by said computer system to perform process steps for generating a transaction screen display report from a hierarchical database management log, said process steps comprising:
   extracting a plurality of log records from said hierarchical database management log for subsequent processing by a batch terminal simulator;
   creating a cross reference record for each of selected ones of said plurality of log records, said cross reference records forming a cross reference file;
   creating a BTS SYSIN file comprising at least one "PA2 $" record;
   executing said batch terminal simulator wherein a BTS screen display report is generated utilizing said BTS SYSIN file and wherein said BTS screen display report comprises a plurality of BTS screen display records, each of said plurality of BTS screen display records generated from a corresponding log record of said plurality of log records; and
   modifying selected ones of said plurality of BTS screen display records corresponding to said selected ones of said plurality of log records utilizing information from said cross reference file to form said transaction screen display report.

15. The article of manufacture of claim 14 wherein said hierarchical database management log is generated by an IMS HDBMS.

16. The article of manufacture of claim 15 wherein said extracting, creating, executing and modifying is performed independent of said IMS HDBMS.

17. The article of manufacture of claim 14 wherein said extracting step further comprises the application of a user specified selection criteria.

18. The article of manufacture of claim 14 wherein said transaction screen display report comprises a file.

19. The article of manufacture of claim 15 wherein said plurality of BTS screen display records correspond to IMS queue messages.

20. The article of manufacture of claim 19 wherein said transaction screen display report is viewable in a form that approximates in its appearance display screens utilized in the formation of said corresponding IMS queue messages.

* * * * *